(No Model.) 3 Sheets—Sheet 1.

H. THADEN.
POTATO PLANTER.

No. 417,605. Patented Dec. 17, 1889.

Witnesses
L. F. Hayden
A. P. Wood

Inventor
HERMAN THADEN.
By his Attorney
Albert A. Wood (No Model.) 3 Sheets—Sheet 2.
H. THADEN.
POTATO PLANTER.

No. 417,605. Patented Dec. 17, 1889.

Witnesses
L. F. Hayden
A. P. Wood

Inventor
HERMAN THADEN
By his Attorney
Albert A. Wood (No Model.)    H. THADEN.    3 Sheets—Sheet 3.
POTATO PLANTER.

No. 417,605.    Patented Dec. 17, 1889.

Witnesses
N. R. Wood
A. P. Wood

Inventor
HERMAN THADEN
By Attorney
Albert A. Wood

UNITED STATES PATENT OFFICE.

HERMAN THADEN, OF ATLANTA, GEORGIA.

POTATO-PLANTER.

SPECIFICATION forming part of Letters Patent No. 417,605, dated December 17, 1889.

Application filed February 25, 1889. Serial No. 301,149. (No model.)

*To all whom it may concern:*

Be it known that I, HERMAN THADEN, a citizen of the United States, and a resident of Atlanta, in the county of Fulton and State of Georgia, have invented certain new and useful Improvements in Machinery for Planting Potatoes; and I hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improved machinery for planting potatoes in hills at regular intervals and covering the same to the required depth with light fresh soil, having first made a furrow in which to deposit them.

The object is to construct a planter that will plant pieces of potato or whole ones, and to do this equally well regardless of the size or weight of the potato or piece of potato.

The invention consists, briefly, of a reciprocating plunger carried in an oscillating guide, which said plunger and guide are operated by a novel arrangement of cams, a lever and an eccentric slot in said guide, and a hopper having novel agitating and restricting devices, the whole being actuated, where motion is required, by means of a belt from a driving-wheel in contact with the ground.

All of these details and all others pertaining hereto are hereinafter fully set forth, and the parts claimed as new pointed out in the claims.

Figure 1:
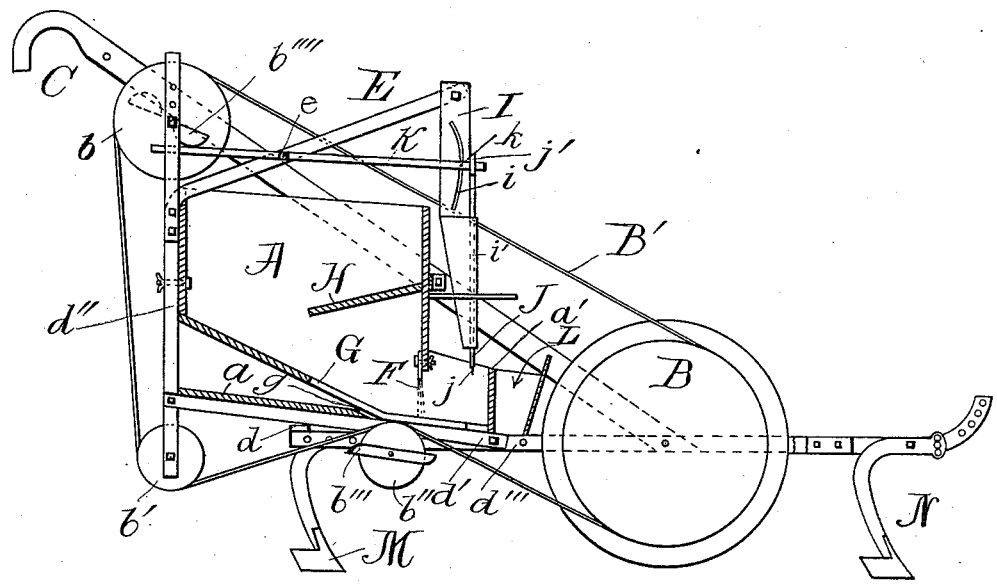
Figure 2:
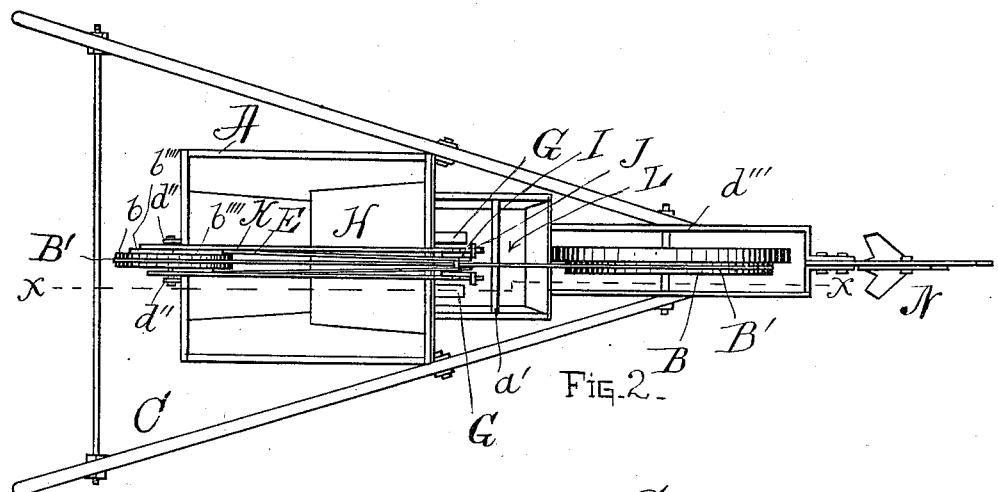
Figure 3:
Figure 4:
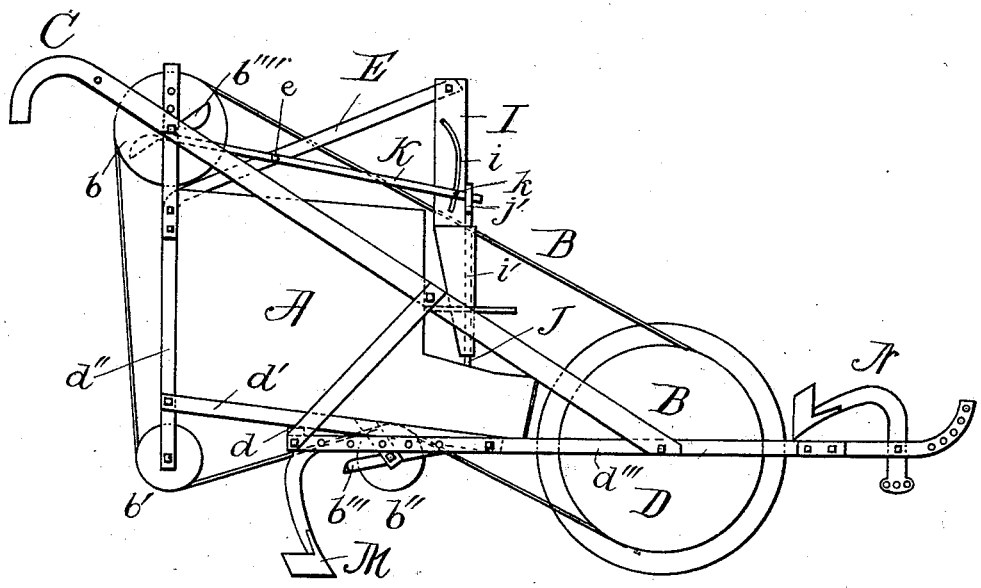
Figure 5:
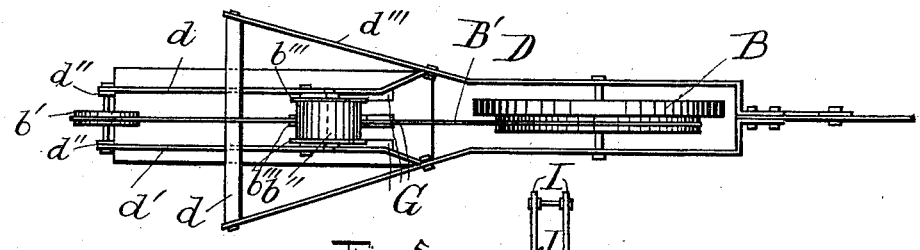
Figure 6:
Figure 8:
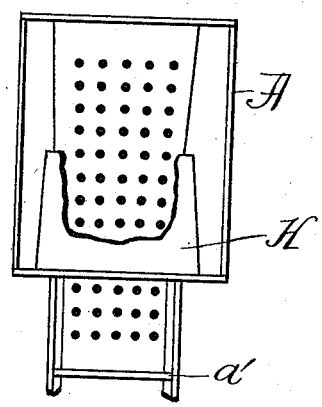
Figure 7:
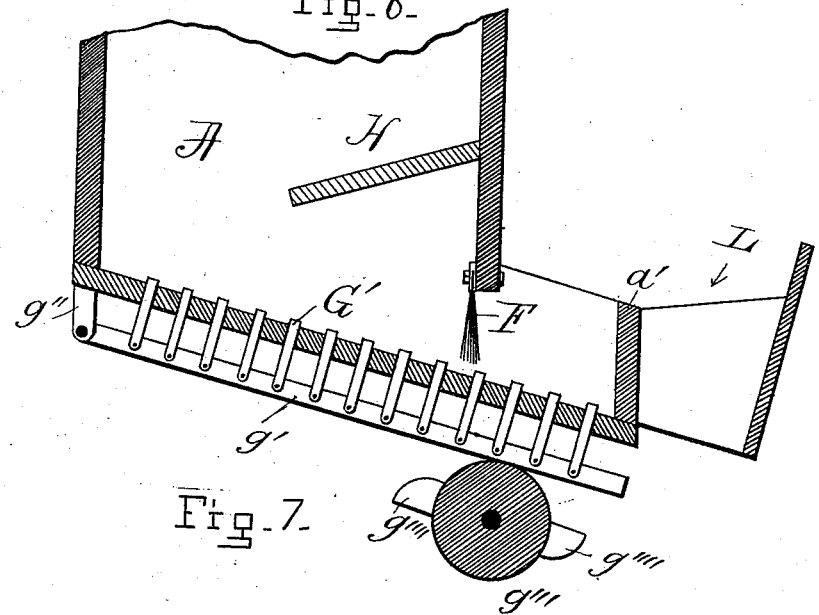

In the accompanying drawings, Figure 1 is a side elevation of the device in section on line *x x*, Fig. 2, showing the interior arrangement of parts, the driving-wheel, and the plows for making the furrow and for covering the potatoes. Fig. 2 is a plan of the device, further showing the operative parts. Fig. 3 is a detail view showing one of the agitators in the bottom of the hopper and the preferable manner of hinging it to the hopper-bottom. Fig. 4 is a side elevation of the device, showing its exterior arrangement and also the plow in front turned up out of the way. Fig. 5 is a view of the bottom of the planter as shown in Fig. 4, excepting the plows and their standards being removed, this figure showing more clearly the agitators in the bottom of the hopper, their actuating-cams, and the form of frame preferred. Fig. 6 is a view of the plungers and guides from the front of the device, showing the pins, also, which prevent lateral movement of the oscillating guides. Fig. 7 is a sectional view showing one row of the agitators necessary to feed pieces of potato. Fig. 8 is a plan of the hopper, showing the bottom perforated for the purpose of receiving the pins shown in Fig. 7.

In these figures, like reference-marks indicating corresponding parts in the several views, A is the hopper, B the wheel on which the device runs, C the handles, and D the frame, all of which may be of any form or construction consistent with the requirements. The frame D is preferably made, however, in substantially the form shown, and of flat iron of sufficient size. The piece $d'''$, being bent together at the front end and securely bolted, passes backwardly, as shown in Fig. 5, diverging at about midway between the two ends, and is bolted to the piece $d$. Near the diverging point of these two bars $d'''$ are bolted two bars $d'$, which pass rearwardly under the hopper and over the said piece $d$, and have attached to their ends the bars $d''$, which pass upwardly and carry the bracket E and the sheaves $b$ and $b'$ at their tops and bottom, respectively. The hopper A rests on the bars $d'$ and against the vertical bars $d''$, to any or all of which it may be secured in any approved manner. For the clearest views of this hopper A, attention is called to Figs. 1 and 2. In these figures it will be seen that the hopper is composed of two compartments, separated the one from the other by means of a brush F, of bristles or other material of sufficient resilience. In the bottom of the hopper and under this brush F are the agitators G, which are pivoted on springs $g$, as shown in Fig. 3, said springs being secured at one end to the agitators and at the other to the piece $a$ of the hopper, in which manner it seems preferable to make the connection between the agitators and their sustaining-piece. These agitators are actuated by the cams $b'''$ on the wheel $b''$, against which the belt B' runs. These agitators are found by experience to be sufficient when only whole potatoes are to be planted, which, owing to their having no flat sides, will readily run down an incline such as the bottom of the hopper above the brush, the function of these agitators being merely to work the potatoes forward against the restriction which is provided by the brush, and which is necessary in the case of whole potatoes.

If it is desired to plant pieces of potato, the agitators G' (shown in Figs. 7 and 8) are used either alone or in conjunction with the agitators G, as desired, the agitators G being, in case both are used together, placed between and alternating with, in position, the agitators G.

The agitators shown in Figs. 7 and 8 are constructed substantially as follows: The agitators G' are attached to bars g', preferably about five in number, and pass upwardly from these bars through the bottom board of the hopper, in which they should slide freely. The bars g' are pivoted, as shown in Fig. 7, to hangers g'', attached to the hopper at its back end, as shown. The forward end of the bar g' rests on the periphery of the roller g''', which carries double cams g'''', as many in number as there are bars g', and in case both agitators G and G' are used, as would sometimes be necessary, carrying cams b''', also, for the purpose of actuating said levers G, and being in any case driven by the belt B' from the wheel B. If necessary, a dam H may be placed in the hopper in such a position as to prevent the superincumbent weight from forcing the potatoes out through the bristles so fast as to impede the proper operation of the feeding device. The bottom of the hopper is preferably sloping, as shown, to allow of the ready clearing thereof in operation. The bracket E has pivoted at its forward end, as shown, the oscillating guide I, which is provided with an eccentric slot $i$ and carries the reciprocating plunger J, said plunger freely sliding in said guide in suitable bearings and having at its lower end the spikes or needles $j$, which may be attached in any number and manner desired, and at its upper end the slot $j'$ for the entry of the end of the lever K.

Pivoted at the required point $e$ on the bracket E is the lever K, which has a pin $k$, that enters the eccentric slot $i$ in the guide. This lever K extends backwardly from its pivotal point a sufficient distance to allow of the cams $b''''$ on the sheave $b$ striking it and raising its other end a sufficient distance to perform its functions, as follows: The eccentric slot $i$ is radial to the pivotal point of the lever K for a sufficient distance to allow said lever to raise the plunger J clear of the partition $a'$, beyond which point the slot is eccentric to cause the continued upward movement of the lever K to throw the guide out a sufficient distance to allow the potato to drop down through the chute L as soon as the withdrawal of the plunger into the sheath $i'$ will force the potato from the needle $j$.

The distance apart of the hills in the row is governed by the size of the sheave $b$ and the number of cams thereon, changing either of which adjusts the implement to plant nearer or farther, as the case may be.

The plows M may be adjusted as to width by moving them along the side pieces of the frame to which they are secured, as shown.

The plow N is preferably adapted to be turned up out of the way in order that the implement may be transported to the place of operation conveniently on the wheel B.

Having thus described my invention, what I claim as new, and desire to secure by Letters Patent of the United States, is—

1. In a potato-planter, the combination of the bracket E, supported by the frame of the machine, the oscillating guide I, carried by said bracket, a reciprocating plunger having a needle in its lower end operating in said guide, the lever K, pivoted to the bracket E and attached at one end to the reciprocating plunger, and sheave $b$, carrying cams $b''''$ for operating said lever, and the mechanism for driving said sheaves, substantially as set forth.

2. In a potato-planter, the agitating device in the bottom, consisting of the lever $g'$, pivoted to the lug $g''$, the pins G', pivoted to said lever, and the sheave $g'''$, carrying the cam $g''''$, revolving under the free end of the lever $g'$, for the purpose set forth.

In testimony whereof I hereunto affix my signature in presence of two witnesses.

HERMAN THADEN.

Witnesses:
A. P. WOOD,
A. A. WOOD.